United States Patent [19]

Kemp

[11] Patent Number: 4,629,716

[45] Date of Patent: Dec. 16, 1986

[54] PROCESS FOR PRODUCING NARROW-PORE CATALYST SUPPORTS

[75] Inventor: Richard A. Kemp, Stafford, Tex.

[73] Assignee: Shell Oil Company, Houston, Tex.

[21] Appl. No.: 722,918

[22] Filed: Apr. 15, 1985

[51] Int. Cl.$^4$ .................... B01J 27/14; B01J 27/24; B01J 27/053; B01J 27/125

[52] U.S. Cl. .................... 502/208; 502/201; 502/217; 502/231; 502/355; 502/439; 423/628

[58] Field of Search ............... 502/201, 208, 217, 231, 502/355, 439; 423/628

[56] References Cited

U.S. PATENT DOCUMENTS

| | | | |
|---|---|---|---|
| 2,295,977 | 9/1942 | Thomas et al. | 502/231 |
| 2,894,900 | 7/1959 | Hemminger | 502/217 X |
| 2,943,065 | 6/1960 | Braithwaite | 502/439 |
| 3,124,418 | 3/1964 | Malley et al. | 502/439 X |
| 3,520,654 | 7/1970 | Carr et al. | 502/439 X |
| 3,864,461 | 2/1975 | Miller et al. | 502/439 X |
| 4,154,812 | 5/1979 | Sanchez et al. | 502/439 X |
| 4,202,798 | 5/1980 | Johnson et al. | 252/437 |
| 4,371,513 | 2/1983 | Sanchez et al. | 502/355 X |

*Primary Examiner*—Andrew H. Metz
*Assistant Examiner*—William G. Wright
*Attorney, Agent, or Firm*—Pamela J. McCollough

[57] ABSTRACT

This invention relates to a process for preparing catalyst supports with a narrow pore size distribution by simultaneously titrating an acid aluminum species, a basic aluminum species and a phosphorus oxide. The porous alumina supports have surface areas above about 300 m$^2$/g with more than 80% of the pores having diameters less than 50 Å.

12 Claims, No Drawings

PROCESS FOR PRODUCING NARROW-PORE CATALYST SUPPORTS

FIELD OF THE INVENTION

This invention relates to a process for preparing porous alumina supports having high surface areas and a high proportion of their pore volume in pores having diameters less than 50 Å.

BACKGROUND OF THE INVENTION

In the catalytic processing of petroleum feed stocks, it is often desirable to alter the pore structure of the catalyst support in order to accommodate different types of feeds. For example, when processing feed stocks of high metals content, wide-pore supports are used to prevent plugging of the pores by deposition of metals. On the other hand, when processing feed stocks containing no metals or with a low metals content, it may be both technically and economically desirable to use a narrow-pore catalyst support. For purposes of denitrification, narrow-pore catalysts have higher activities and longer lives than catalysts containing large pores which tend to deactivate quickly.

SUMMARY OF THE INVENTION

The present invention relates to a process for the preparation of porous narrow-pore alumina supports having surface areas above about 300 m$^2$/g, at least about 80%, preferably about 90%, of the pore diameters less than about 50 Å, a nitrogen pore volume ranging from about 0.35 cc/g to about 0.65 cc/g, and a crush strength greater than about 20 lbs. These supports are prepared by a process which comprises (a) precipitating an acid aluminum salt in an aqueous solution in the presence of a phosphorus-containing compound by contact with a basic aluminum compound, (b) aging the precipitate of step (a) at a temperature ranging from about 20° C. to about 90° C. for at least 15 minutes at a pH ranging from about 9.0 to about 11.0, (c) washing the product of step (b), (d) drying the product of step (b) at a temperature in the range from about 50° C. to about 150° C, and (e) calcining the product of step (d) at a temperature ranging from about 300° C. to about 900° C.

It has been found that by using phosphorus in the precipitation step, a suitable control over the pore size distribution of the support can be obtained.

DESCRIPTION OF THE PREFERRED EMBODIMENTS

In the process of the instant invention, an acidic aluminum species and a basic aluminum species are utilized in combination with a phosphorus-containing compound to produce a phosphated alumina hydrogel which upon calcination has at least 80% of its pore volume in pores of less than 50 Å, a surface area greater than 300 m$^2$/g and a nitrogen pore volume of about 0.35 cc/g to about 0.65 cc/g.

Precipitation of the alumina hyrogels must be carried out by a concurrent titration procedure in order to create a well-defined and constant environment for the precipitation. If the precipitation is carried out sequentially, where an acid species is added to a basic species, or the reverse, where a basic species is added to an acid species, the pH is constantly changing and the support obtained does not have the same pore size distribution as that obtained when the concurrent titration procedure is used.

In the instant invention, the hydrogel is prepared by the simultaneous addition of an aqueous alkali metal aluminate and an aqueous solution of an acidic aluminum salt, at least one of which contains a phosphorus-containing compound dissolved therein, to cause precipitation of the alumina gel. Aluminum sulfate, nitrate or chloride are suitable examples of acid aluminum salts with aluminum chloride being preferred. Alkali metal aluminates are used in the basic precipitation solution, with sodium or potassium aluminate being preferred.

The phosphorus-containing compound is preferably phosphoric acid and is preferably mixed with the acidic aluminum species prior to precipitation. Alternatively, the phosphorus-containing compound may be sodium or ammonium phosphate and mixed with the basic aluminum species prior to precipitation without significantly affecting the results. In a preferred embodiment, the phosphorus-containing compound is prepared using commercially available 85% phosphoric acid although other material may be utilized. The amount of phosphorus-containing compound added to the acid aluminum species or the basic aluminum species is such that the amount of phosphorus present in the final calcined alumina support is from about 0.1% to about 4.5% by weight, preferably from about 0.5% to about 4% and most preferably from about 1% to about 3%. The presence of greater amounts of phosphorus in the final calcined product results in unacceptably low densities and crush strengths.

The temperature and pH of the precipitation are important variables in the preparation of the instant aluminas needed to produce desirable physical qualities and a narrow pore size distribution. Changes in precipitation temperatures and pHs result in changes in porosities. Depending upon the results desired, one skilled in the art can determine the required precipitation temperature and pH within the afterdescribed limitations with minimal experimentation. In the instant invention, a precipitation temperature typically ranges from about 20° C. to about 90° C., and preferably from about 50° C. to about 85° C., and a precipitation pH typically ranges between about 5.5 and about 10.0, preferably between about 5.5 and about 8.0, and more preferably between about 6.0 and about 7.5. The length of time required for the precipitation step is not critical. However, the maximum rate of addition of the acid aluminum species and the basic aluminum species is fixed by the efficiency with which the two streams can be mixed and the pH and temperature of the system effectively controlled.

After the precipitation step is completed, the pH of the slurry is adjusted by the addition of the basic aluminate solution to fall in the range from about 9.0 to about 11.0, preferably about 9.5 to about 10.5, and aged at a temperature in the range from about 20° C. to about 90° C., preferably about 50° C. to about 85° C. for at least 15 minutes. An upper limit on the length of time for aging is not critical and is normally determined by economical considerations. Aging times will typically range from about 0.1 to about 10 hours, preferably from about 0.25 to about 5 hours, and more preferably from about 0.25 to about 1 hour. In general, aluminas with acceptable properties are produced by holding the aging temperature equal to the precipitation temperature. The aging pH, however, is critical. Products with acceptable pore size distributions are prepared only when the aging pH is between about 9.0 and about 11.0, and preferably between about 9.5 and about 10.5. Compounds prepared at lower pH values contain primarily macropores. The products formed containing primarily macropores have unacceptably low crush strengths. Aging at excessively high pHs will result in materials having excessively high salt contents.

After aging, the slurry is washed and filtered in routine fashion to remove substantially all of the salts formed during the precipitation of the hydrogel. The preferred solvent for washing is water although other solvents such as lower alkanols may be utilized.

After filtering, the material may be dried, mulled with addition of water, extruded or pelleted and calcined, or alternatively, partially dried, extruded or pelleted, dried more completely and calcined. Drying is accomplished by conventional means. It may be carried out by forced draft drying, vacuum drying, air drying or similar means. Drying temperatures are not critical and depend upon the particular means utilized for drying. Drying temperatures will typically range from about 50° C. to about 150° C.

Normally, the material is extruded after drying to the proper loss on ignition (LOI). However, to facilitate extrusion, organic binders and/or lubricants may be added prior to extrusion.

After drying, the material is calcined to cause conversion to γ-alumina. The material may be calcined in any atmosphere, reducing, oxidizing or neutral, although air is preferred. However, if binders and/or lubricants are used, the material is heated in an oxygen-containing atmosphere, preferably air, in order to burn out the binders and lubricants. Calcining temperatures will typically range from about 300° C. to about 900° C. Burn-out temperatures will depend on the concentration of oxygen in the burn-out atmosphere as well as the burn-out time involved. Typically, burn-out temperatures will range from about 300° C. to about 900° C. Drying, calcining and burn-out may be combined in one or two steps. Most frequently, the calcining and burn-out steps are combined using an oxygen-containing atmosphere.

Certain other processing steps may be incorporated into the above described procedure without deviating from the scope and intent of this invention. For example, prior to the complete drying of the hydrogel, it may be extruded and then dried more completely, followed by calcination.

The porous aluminas of the instant invention can be used as catalyst supports or as catalysts per se. As catalysts, the porous aluminas are useful in reactions which can be typically catalyzed by aluminas. For example, aluminas are particularly useful in hydrocracking and isomerization reactions.

The porous aluminas of the instant invention are particularly useful when utilizing as supports for catalytically active Group VIB (i.e., Cr, Mo, W) and Group VIII metals. These catalyzed materials can be suitably applied to hydrocarbon conversion processes such as, for example, hydrotreating and hydrogenation.

The process for preparing narrow-pore catalyst supports will be further described below by the following examples which are intended for illustration and are not to be construed as limiting the invention.

EXAMPLE 1

Seven hundred and forty grams of reagent grade sodium aluminate were added to 1000 grams of water which was then heated to 60° C. in order to effect solution of the materials. Five hundred and forty-two grams of aluminum chloride hexahydrate were added to 760 grams of water. One hundred and twelve grams of 85% phosphoric acid along with 112 grams of water were added to the aluminum chloride solution which was then heated to 60° C. Both solutions were cooled to slightly less than 60° C. and placed in dropping funnels.

Five thousand grams of water were added to a 10 liter stainless steel bucket equipped with a pH meter, thermometer and stirrer, to serve as the heel. After the pH of the heel was adjusted to 7.0 using the sodium aluminate solution, the two solutions in the dropping funnels were added simultaneously to the well-stirred bucket, maintaining a precipitation pH of 7. When approximately 200 milliliters of the sodium aluminate solution remained, addition of the aluminum chloride solution was stopped and only the sodium aluminate solution was added to adjust the pH of the solution to 10. The solution was aged for one hour at 60° C. The resulting material was filtered and washed in two large Buchner funnels with about 50 liters of water. The excess water from the wet filter cake was removed by vacuum. The hydrogel was then extruded using a small, hand-held extruder, dried overnight at 120° C. and calcined in air at 565° C. The properties of the support are listed in Table I.

COMPARATIVE EXPERIMENT A

A support was prepared according to Example I, except that the material was aged at a pH of 8. Results of the experiment are listed in Table I.

COMPARATIVE EXPERIMENT B

A support was prepared according to Example I, except that no phosphorus-containing compound was added. The results are listed in Table I.

TABLE I

| | Carrier Properties | | |
|---|---|---|---|
| | Example 1 | Comparative Experiment A | Comparative Experiment B |
| Aging pH[a] | 10.0 | 8.0 | 10.0 |
| Density g/cc[b] | 0.73 | 0.14 | 0.79 |
| Percent Shrinkage[c] | 58 | 19 | 56 |
| $N_2$ Surface Area m²/g[d] | 365 | 279 | 251 |
| $N_2$ Pore Volume cc/g[e] | 0.49 | 1.19 | 0.45 |
| Flat Plate Crush Strength lbs[f] | 30 | 1 | 22 |
| % wt. Phosphorus[g] | 2.0 | 4.8 | 0.0 |
| Hg Pore[h] Size Dist. | | | |
| 50 ang | 92.5 | 0.4 | 30.1 |
| 50–70 ang | 2.3 | 0.4 | 64.0 |
| 70–100 ang | 1.6 | 0.4 | 1.9 |
| 100–150 ang | 1.7 | 0.4 | 1.7 |
| 150–350 ang | 1.5 | 0.2 | 1.6 |
| 350 ang | 0.4 | 98.2 | 0.8 |
| Ave Pore Diameter | 40.0 | 9269.0 | 52.1 |

[a]Measured using an Orion 231 pH meter and Orion electrodes.
[b]209 cc volume fully settled in a graduated cup and weighed.
[c]Defined as $1 - \frac{\text{extrudate size after calcining}}{\text{die size of extruder}}$ expressed as percent.
[d]BET, by nitrogen adsorption/desorption, Micromeritics Digisorb 2500 Instrument.
[e]By nitrogen adsorption, Micromeritics Digisorb 2500 Instrument.
[f]Flat plate, single pellet, extrudate approximately 5 mm in length.
[g]Weight percent deterinined by neutron activation analysis.
[h]Determined by mercury intrusion, to 60,000 psi using a Micromeritics Autopore 9200, using a 130° contact angle and 0.473 N/m surface tension of mercury. Numbers listed are percent pore volume except the average pore diameter which is in angstroms.

I claim:

1. A process for the preparation of narrow-pore alumina supports having surface areas above about 300 m$^2$/g, at least about 80% of the pore diameters less than about 50 Å, a crush strength greater than about 20 lbs. and containing an amount of phosphorus in the range from about 0.1% to about 4.5% by weight, which process comprises:
   (a) concurrently titrating at a pH in the range between about 5.5 and about 10.0 an aqueous solution of an acid aluminum salt and a phosphorus-containing compound with an aqueous solution of a basic aluminum compound, thereby forming a precipitate,
   (b) aging the precipitate at a temperature in the range between about 20° C. and about 90° C. for at least 15 minutes at a pH in the range between about 9.0 to about 11.0,
   (c) washing the precipitate,
   (d) drying the precipitate, and
   (e) calcining the precipitate at a temperature ranging from about 300° C. to about 900° C.

2. The process of claim 14 wherein the amount of phosphorus in the final calcined support is in the range from about 1% to about 3% by weight.

3. The process of claim 1 wherein the titration is carried out at a pH in the range between about 5.5 and about 8.0.

4. The process of claim 1 wherein the titration is carried out at a temperature between about 20° C. and about 90° C.

5. The process of claim 4 wherein the precipitation is carried out at a temperature between about 50° C. and about 85° C.

6. The process of claim 1 wherein the aging pH is in the range between about 9.5 and about 10.5.

7. A process for the preparation of narrow-pore alumina supports having surface areas above about 300 m$^2$/g, at least about 80% of the pore diameters less than about 50 Å, a crush strength greater than about 20 lbs. and containing an amount of phosphorus in the range from about 0.1% to about 4.5% by weight, which process comprises:
   a. concurrently titrating at a pH in the range between about 5.5 and about 10.0 an aqueous solution of an acid aluminum salt and phosphoric acid with a basic aluminum compound in an aqueous solution, thereby forming a precipitate,
   b. aging the precipitate at a temperature in the range between about 50° C. and about 85° C. for at least 15 minutes at a pH in the range between about 9.5 and about 10.5,
   c. washing the precipitate,
   d. drying the precipitate, and
   e. calcining the precipitate at a temperature ranging from about 300° C. to about 900° C.

8. The process of claim 7 wherein step (a) is carried out at a pH in the range between about 5.5 and about 8.0.

9. The process of claim 7 wherein step (a) is carried out at a temperature in the range between about 50° C. and about 85° C.

10. A process for the preparation of narrow-pore alumina supports having surface areas above about 300 m$^2$/g, at least about 80% of the pore diameters less than about 50 Å, a crush strength greater than about 20 lbs. and containing an amount of phosphorus in the range from about 0.1% to about 4.5% by weight, which process comprises:
    (a) concurrently titrating at a pH in the range between about 5.5 and about 10.0 an aqueous solution of an acid aluminum salt with an aqueous solution of a basic aluminum compound and sodium phosphate, thereby forming a precipitate,
    (b) aging the precipitate at a temperature in the range between about 50° C. and about 85° C. for at least 15 minutes at a pH in the range between about 9.5 to about 10.5,
    (c) washing the precipitate,
    (d) drying the precipitate, and
    (e) calcining the precipitate at a temperature ranging from about 300° C. to about 900° C.

11. The process of claim 10 wherein step (a) is carried out at a pH in the range between about 5.5 and about 8.0.

12. The process of claim 10 wherein step (a) is carried out at a temperature between about 50° C. and about 85° C.

* * * * *